(12) United States Patent
Nishiura

(10) Patent No.: US 10,603,823 B2
(45) Date of Patent: Mar. 31, 2020

(54) DISPLAY DEVICE, THREE-DIMENSIONAL IMAGE FORMING SYSTEM, AND COMPUTER-READABLE STORAGE MEDIUM

(71) Applicant: CASIO COMPUTER CO., LTD., Tokyo (JP)

(72) Inventor: Fusao Nishiura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 189 days.

(21) Appl. No.: 15/641,578

(22) Filed: Jul. 5, 2017

(65) Prior Publication Data

US 2018/0079118 A1    Mar. 22, 2018

(30) Foreign Application Priority Data

Sep. 21, 2016   (JP) .................. 2016-184704

(51) Int. Cl.
| | |
|---|---|
| B29C 44/60 | (2006.01) |
| H04N 1/00 | (2006.01) |
| B29L 31/00 | (2006.01) |
| B29C 44/02 | (2006.01) |
| B29K 105/04 | (2006.01) |
| B29K 105/00 | (2006.01) |

(52) U.S. Cl.
CPC .......... *B29C 44/60* (2013.01); *H04N 1/0044* (2013.01); *H04N 1/00411* (2013.01); *B29C 44/022* (2013.01); *B29K 2105/04* (2013.01); *B29K 2105/256* (2013.01); *B29L 2031/722* (2013.01); *B29L 2031/7232* (2013.01)

(58) Field of Classification Search
None
See application file for complete search history.

(56) References Cited

U.S. PATENT DOCUMENTS

| | | | | |
|---|---|---|---|---|
| 4,258,361 | A * | 3/1981 | Hydes | G09G 1/007 |
| | | | | 345/635 |
| 2004/0032601 | A1 | 2/2004 | Ishii et al. | |
| 2004/0120596 | A1* | 6/2004 | Ishii | H04N 1/6011 |
| | | | | 382/254 |
| 2006/0034647 | A1* | 2/2006 | Takada | B41J 3/32 |
| | | | | 400/76 |
| 2006/0061569 | A1* | 3/2006 | Yamada | H04N 13/261 |
| | | | | 345/422 |

(Continued)

FOREIGN PATENT DOCUMENTS

| | | |
|---|---|---|
| JP | S64-28660 A | 1/1989 |
| JP | 2001-150812 A | 6/2001 |

(Continued)

*Primary Examiner* — Jason Lin
(74) *Attorney, Agent, or Firm* — Chen Yoshimura LLP

(57) ABSTRACT

For creating a surface-textured image on a thermally expandable sheet, an image editor edits the original image data in a plurality of editing manners to generate a plurality of edited image data, the plurality of edited image data corresponding to mutually different textured surface profiles to be created on the thermally expandable sheet, and the image editor causes a display unit to display a plurality of preview images that are generated in accordance with the plurality of edited image data, respectively, in such a manner as to enable a comparison of differences among the plurality of editing manners by a user.

20 Claims, 16 Drawing Sheets

(56) References Cited

U.S. PATENT DOCUMENTS

| | | | |
|---|---|---|---|
| 2006/0104693 A1* | 5/2006 | Takada | B41J 3/32 400/109.1 |
| 2006/0134587 A1* | 6/2006 | Akaiwa | B41J 3/32 434/114 |
| 2006/0197986 A1* | 9/2006 | Takada | B41J 3/32 358/1.18 |
| 2006/0221416 A1 | 10/2006 | Yamada | |
| 2006/0228146 A1* | 10/2006 | Takayama | B41J 3/32 400/109.1 |
| 2012/0125217 A1* | 5/2012 | Daniell | B41M 3/003 101/481 |
| 2012/0199994 A1* | 8/2012 | Richert | B29C 39/148 264/1.35 |
| 2013/0161874 A1* | 6/2013 | Horiuchi | B29C 44/022 264/415 |
| 2013/0162633 A1* | 6/2013 | Berger | G06T 15/04 345/419 |
| 2014/0110887 A1* | 4/2014 | Horiuchi | B41J 3/28 264/413 |
| 2016/0016362 A1* | 1/2016 | Kim | B23Q 15/00 700/98 |
| 2016/0075083 A1* | 3/2016 | Motoyanagi | B29C 44/353 264/41 |

FOREIGN PATENT DOCUMENTS

| | | |
|---|---|---|
| JP | 2004-077841 A | 3/2004 |
| JP | 2006-277605 A | 10/2006 |
| JP | 2008-304709 A | 12/2008 |
| JP | 2009-115838 A | 5/2009 |

* cited by examiner

Original image (line drawing)

Contour extracted image (foam data: black portions are protrusions)

Inverted image of contour extracted image (foam data: white portions are recesses)

Original image (engraving, etc.)

Decolorized image (foam data: white portions are recesses)

Inverted image of decolorized image (foam data: black portions are protrusions)

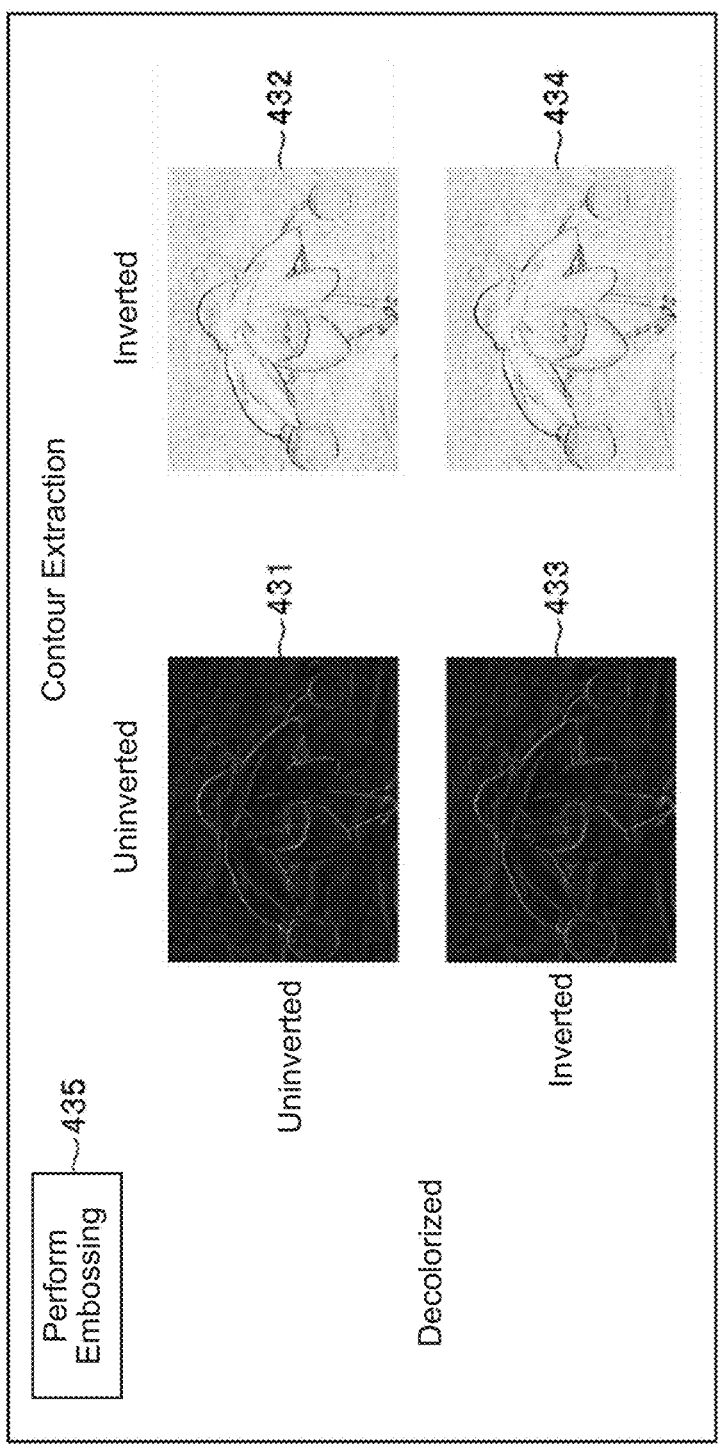

FIG. 10A

Contribution rate setting screen — 420b

Choose picture for auto-creation
Contribution   Decolor ■ ─────●───── 425
   Rate
Contribution Rate   ☐ Yes   ■ No
                            Contour
                            Extraction

FIG. 10B

430b Preview Screen

Contour Extraction

[Perform Embossing] — 435

Uninverted — 436     Inverted — 437

Decolorized

Inverted — 438     Inverted — 439

FIG. 11A
Choose picture for auto-creation
Contribution Rate — Decolor ———————————— 420c Contribution rate setting screen
425
☐ Yes ■ No
Contour Extraction
FIG. 11B
Contour Extraction
Uninverted 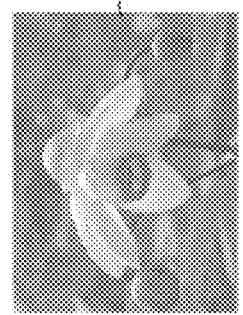 451   Inverted 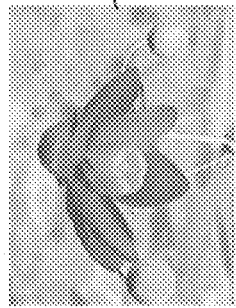 452
Perform Embossing — 435
Decolorized
Inverted 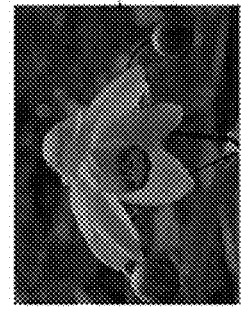 453   Inverted 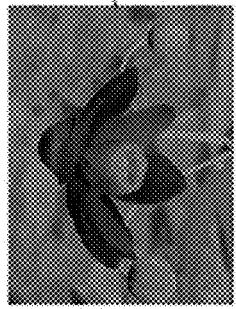 454
430c Preview Screen

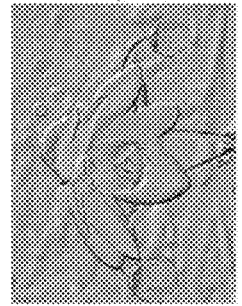
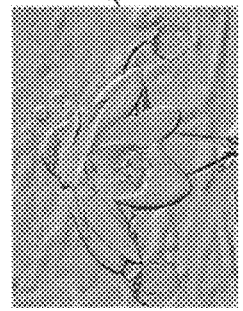
FIG. 14A
FIG. 14B

Choose picture for auto-creation
Contribution Rate  Decolor ──────●───── Contribution rate setting screen
                   ☐ Yes  ■ No
                   425       Contour Extraction
420c
FIG. 15A
Contour Extraction
Uninverted                    Inverted
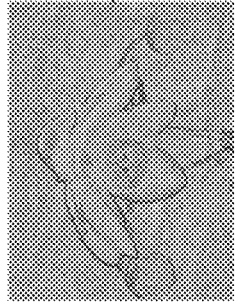          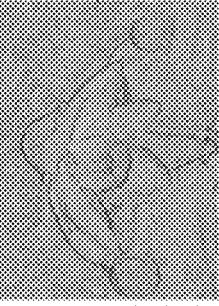
451a                          452a
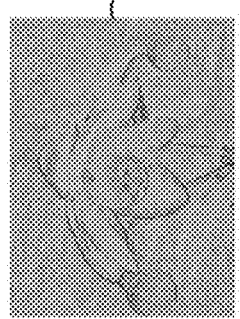          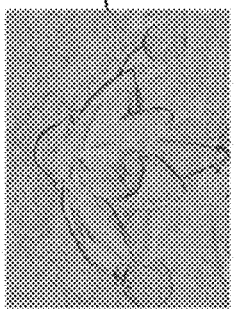
453a                          454a
Uninverted                    Inverted
Decolorized
445 Remove Embossing
440c Embossing Preview Screen
FIG. 15B

DISPLAY DEVICE, THREE-DIMENSIONAL IMAGE FORMING SYSTEM, AND COMPUTER-READABLE STORAGE MEDIUM

BACKGROUND OF THE INVENTION

Technical Field

The present invention relates to a display device, a three-dimensional image forming system, a display program, and an image forming program.

Background Art 2.5D three-dimensional image forming techniques using foamable sheets are known as one type of shaping technique and are used for creating teaching materials for visually impaired people, such as braille, for example. The techniques in Japanese Patent Application Laid-Open Publication No. S64-28660 and Japanese Patent Application Laid-Open Publication No. 2001-150812, for example, have been disclosed as such techniques.

Japanese Patent Application Laid-Open Publication No. S64-28660 discloses a "three-dimensional image forming method in which a thermally expandable sheet has a coating layer that includes thermally expandable microspheres on a front surface, a front-rear inverted image of a desired image is formed, using an image forming material having excellent light absorption characteristics, on a sheet front surface of the thermally expandable sheet on which the coating layer is not formed, the thermally expandable sheet is irradiated with light from an image forming side for an image portion to be selectively heated using the light absorption characteristics of the image forming material, and the thermally expandable microspheres within the coating layer are expanded to form a three-dimensional image."

Furthermore, Japanese Patent Application Laid-Open Publication No. 2001-150812 discloses "a foaming shaping system in which a foamable sheet has a foaming layer provided on a base material layer, and the foaming layer is selectively foamed to thereby shape a semi-three-dimensional image."

SUMMARY OF THE INVENTION

However, the techniques described in the above related art documents do not take into consideration implementing a preview display on a display device of a three-dimensional image formed on a medium such as a thermally expandable sheet. Thus, in the techniques described in above related art documents, it was not possible to grasp the feel of a formed three-dimensional image without the three-dimensional image being actually formed on the medium. Here, expressing a three-dimensional image using a cross-sectional view is also feasible. However, with a cross-sectional view, the medium is not viewed from above, and it is therefore not possible to grasp the feel and appearance of the formed three-dimensional image. That is, it is desirable for a flat image to be displayed in a pseudo three-dimensional manner.

The present invention has been devised in order to solve this kind of problem, and an objective thereof is to provide a display device, a three-dimensional image forming system, a display program, and an image forming program with which a flat image can be displayed in a pseudo three-dimensional manner. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a printer for printing a surface-textured image on a thermally expandable sheet, including: a display unit; a user input receiver; a processor connected to the display unit and the user input receiver, the processor being configured to: receive an original image data of an original image to be printed on the thermally expandable sheet; edit the original image data in a plurality of editing manners that are pre-selected or user-selected to generate a plurality of edited image data, the plurality of edited image data corresponding to mutually different textured surface profiles to be created on the thermally expandable sheet; cause a display unit to display a plurality of preview images that are generated in accordance with the plurality of edited image data, respectively, in such a manner as to enable a comparison of differences among the plurality of editing manners by a user; receive, from the user via the user input receiver, a command to select one of the plurality of edited image data; a printing unit that prints a corresponding image on the thermally expandable sheet based on the selected one of the plurality of edited image data; and a light radiating unit that radiates light onto the image printed on the thermally expandable sheet so as to cause the thermally expandable sheet to expand due to thermal expansion, thereby creating the surface-textured image on the thermally expandable sheet.

In another aspect, the present disclosure provides a processor configured to be connected to a printer that prints a surface-textured image on a thermally expandable sheet, the processor being configured to: receive an original image data of an original image to be printed on the thermally expandable sheet; edit the original image data in a plurality of editing manners that are pre-selected or user-selected to generate a plurality of edited image data, the plurality of edited image data corresponding to mutually different textured surface profiles to be created on the thermally expandable sheet; cause a display unit to display a plurality of preview images that are generated in accordance with the plurality of edited image data, respectively, in such a manner as to enable a comparison of differences among the plurality of editing manners by a user; receive, from the user, a command to select one of the plurality of edited image data; and output to a printing unit a printing data in accordance with selected one of the plurality of edited image data.

In another aspect, the present disclosure provides a non-transitory storage medium having stored therein instructions executable by a processor that is configured to be connected to a printer that prints a surface-textured image on a thermally expandable sheet, the instructions causing the processor to perform the following: receive an original image data of an original image to be printed on the thermally expandable sheet; edit the original image data in a plurality of editing manners that are pre-selected or user-selected to generate a plurality of edited image data, the plurality of edited image data corresponding to mutually different textured surface profiles to be created on the thermally expandable sheet; cause a display unit to display a plurality of preview images that are generated in accordance with the plurality of edited image data, respectively, in such a manner as to enable a comparison of differences among the plurality of editing manners by a user; receive, from the user, a command to select one of the plurality of edited image data; and output to a printing unit a printing data in accordance with selected one of the plurality of edited image data.

According to the present invention, a flat image can be displayed in a pseudo three-dimensional manner. It is to be understood that both the foregoing general description and the following detailed description are exemplary and explanatory, and are intended to provide further explanation of the invention as claimed.

BRIEF DESCRIPTION OF THE DRAWINGS

FIG. 5A is a drawing showing an example of an original image of a print or the like.

FIG. 5B is a drawing showing an example of a decolorized image of the print or the like.

FIG. 5C is a drawing showing an example of a decolorized inverted image of the print or the like.

FIGS. 9A and 9B are drawings showing an example of a setting image at a contour extraction contribution rate of 100%, and comparison images.

FIGS. 10 and 10B are drawings showing an example of a setting image at a decolorization contribution rate of 100%, and comparison images.

FIGS. 11A and 11B are drawings showing an example of a setting image when the contour extraction contribution rate is 50% and the decolorization contribution rate is 50%, and comparison images.

FIGS. 14A and 14B are drawings showing an example of images obtained by performing embossing on comparison images at a decolorization contribution rate of 100%.

FIGS. 15A and 15B are drawings showing an example of images obtained by performing embossing on comparison images when the contour extraction contribution rate is 50% and the decolorization contribution rate is 50%.

DETAILED DESCRIPTION OF EMBODIMENTS

Figure 1:
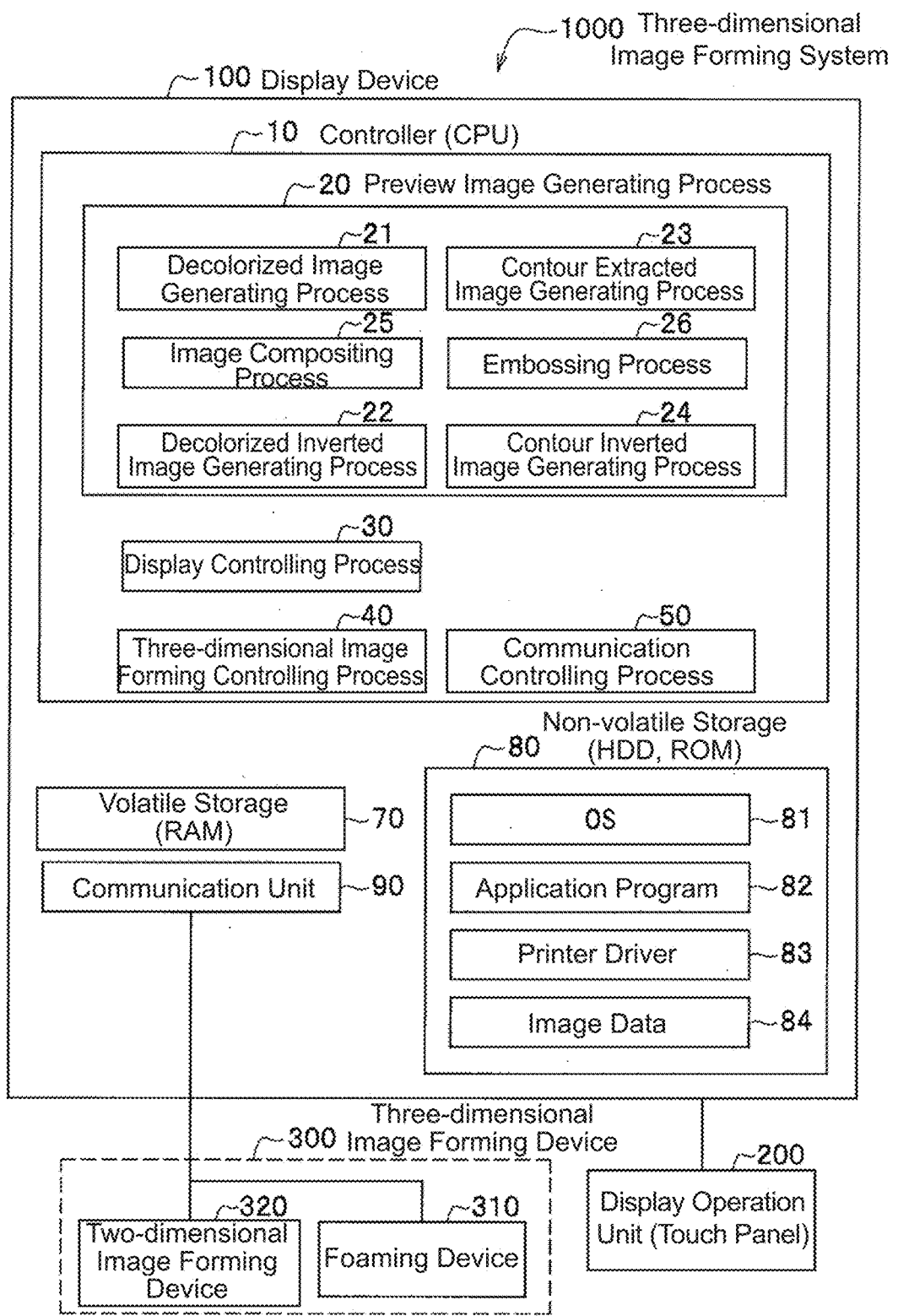
FIG. 1 is a configuration diagram of a three-dimensional image forming system constituting a first embodiment of the present invention.

Hereinafter, an embodiment of the present invention (hereinafter, referred to as "the present embodiment") will be explained in detail with reference to the drawings. It should be noted that each drawing is merely schematically shown to the extent that the present embodiment can be sufficiently understood. Furthermore, in each drawing, common constituent elements and similar constituent elements are denoted by the same reference characters, and redundant explanations thereof are omitted.

First Embodiment

FIG. 1 is a configuration diagram of a three-dimensional image forming system constituting a first embodiment of the present invention.

A three-dimensional image forming system 1000 is provided with a display device 100, a display operation unit 200, a two-dimensional image forming device 320, and a foaming device 310; the two-dimensional image forming device 320 and the foaming device 310 constitute a three-dimensional image forming device 300.

The display device 100 is a general-purpose information processing device that uses an OS (operating system) and is connected to the display operation unit 200, and is used as a control device that controls the foaming device 310 and the two-dimensional image forming device 320. The display device 100 is provided with a controller 10, a volatile storage 70, a nonvolatile storage 80, and a communication unit 90. The volatile storage 70 is a RAM (random access memory) and is used as a work memory. The nonvolatile storage 80 is an HDD (hard disk drive) or a ROM (read only memory) and stores an OS 81, an application program 82, a printer driver 83, image data 84, and the like. The communication unit 90 is a serial interface or a parallel interface for a LAN (local area network) or a USB (universal serial bus), and is USB-connected to the two-dimensional image forming device 320 and serial- or parallel-connected to the foaming device 310 in the present embodiment. The display operation unit 200 is a touch panel that is connected to the display device 100, and is provided with a display unit for displaying a two-dimensional image and an input unit with which an operator performs input.

The foaming device 310 is provided with a halogen lamp (not shown) serving as a heat generating implement (heating implement) in order to heat one surface or both surfaces of a medium having laminated on one surface side thereof a foaming layer (expanding layer) that has microcapsules which foam (expand) due to heat.

The two-dimensional image forming device 320 is an inkjet printer that performs black printing (drawing) in which a specific site of a thermally expandable sheet serving as the medium is foamed (expanded), and color printing of an entire surface of the medium with CMY (cyan-magenta-yellow), for example. Here, the thermally expandable sheet is a sheet-shaped medium having an expanding layer (foaming layer), which expands (foams) due to being heated, provided on the front surface of a mount. The two-dimensional image forming device 320 requires image data (front surface data) of the specific site at which the expanding layer on the front surface of the medium is to be partially expanded, image data (rear surface data) with which the expanding layer is to be partially expanded from the rear surface of the medium, and color image data. Here, the image data of the front surface data and rear surface data also constitutes foaming data with which the foaming layer of the medium is expanded. In other words, black printing is performed for an image that is to be printed on a thermally expandable sheet (foaming sheet) in order for the thermally expandable sheet to be partially expanded and a three-dimensional shape to be expressed by undulations in the front surface of the thermally expandable sheet.

It should be noted that since the halogen lamp generates intense near-infrared light, black (carbon) is strongly heated, and the amount of heating in CMY color printed locations is low. Thus, the medium having the foaming layer foams (expands) only in the specific site where black printing has been performed, and so-called 2.5D printing is carried out. To paraphrase, the two-dimensional image forming device 320 prints a heat conversion layer (black layer) that converts near-infrared light constituting electromagnetic waves into heat. Here, the ink acting as a developer with which black printing is performed includes carbon, and the CMY ink does not include carbon. Thus, the amount of generated heat is low for black having CMY mixed therein. It should be noted that the three-dimensional image forming system 1000 operates as a structure manufacturing system with which a 2.5D structure is manufactured.

The controller 10 is a CPU (central processing unit; processor), and executes a program to thereby realize the functions of a preview image generating process 20, a display controlling process 30, a three-dimensional image forming controlling process 40, and a communication controlling process 50. The preview image generating process 20 generates data for a preview image with which a three-dimensional image to be formed by the foaming device 310 from an original color image is shown in a pseudo manner. The preview image generating process 20 is provided with the functional units of a decolorized image generating process 21, a decolorized inverted image generating process 22, a contour extracted image generating process 23, a contour inverted image generating process 24, an image compositing process 25, and an embossing process 26. The decolorized image generating process 21, decolorized inverted image generating process 22, contour extracted image generating process 23, contour inverted image generating process 24, image compositing process 25, and embossing process 26 function as an editing unit for editing an image to be printed on the thermally expandable sheet, prior to printing of the image to be printed on the thermally expandable sheet.

The decolorized image generating process 21 performs decolorization (grayscale conversion) on the original image and generates a decolorized image 436 (see FIG. 10B). That is, the decolorized image generating process 21 calculates the luminance or brightness of the original image to form a decolorized image (grayscale image). The decolorized inverted image generating process 22 inverts the light and shade of the decolorized image generated by the decolorized image generating process 21, and generates a decolorized inverted image 438 (see FIG. 10B). Furthermore, the decolorized inverted image generating process 22 may perform decolorization after having inverted the light and shade of the original image. The contour extracted image generating process 23 extracts contours of the original image and generates a contour extracted image 431 (see FIG. 9B)

serving as an edge-enhanced image. The contour inverted image generating process 24 inverts the light and shade of the contour extracted image generated by the contour extracted image generating process 23, and generates a contour inverted image 432 (see FIG. 9B). Furthermore, the contour inverted image generating process 24 may extract contours after having inverted the light and shade of the original image.

The image compositing process 25 composites any plurality of images from among the decolorized image 436, contour extracted image 431, decolorized inverted image 438, and contour inverted image 432. That is, the image compositing process 25 generates: a non-inverted composite image (one composite image) obtained by compositing one of the decolorized image and the contour extracted image at a preset first contribution rate and the other at a second contribution rate obtained by subtracting the first contribution rate from 1; a first composite image obtained by compositing one of the decolorized image and the contour inverted image at the first contribution rate and the other at the second contribution rate obtained by subtracting the first contribution rate from 1; a second composite image obtained by compositing one of the contour extracted image and the decolorized inverted image at the first contribution rate and the other at the second contribution rate obtained by subtracting the first contribution rate from 1; and a third composite image obtained by compositing one of the contour inverted image and the decolorized inverted image at the first contribution rate and the other at the second contribution rate obtained by subtracting the first contribution rate from 1.

Here, the first contribution rate x is $0\% \leq x \leq 100\%$, and the second contribution rate $y=(1-x)$ is $0\% \leq y \leq 100\%$. That is, the non-inverted composite image may become the decolorized image 436 (FIG. 10B) or the contour extracted image 431 (FIG. 9B). It should be noted that the first contribution rate x and the second contribution rate y may be $0\% < x, y < 100\%$.

The embossing process 26 carries out embossing on the plurality of composite images (the non-inverted composite image, first composite image, second composite image, and third composite image) composited by the image compositing process 25, and generates embossed images thereof.

A preview image (in particular, an embossed image) displayed on the display operation unit 200 shows a three-dimensional image subsequent to foaming (expanding) in a pseudo manner in two dimensions. Furthermore, an embossed image displays a flat image (black printed image) in a pseudo three-dimensional manner. In particular, an embossed image is an image that makes it easier to grasp the feel and appearance of a formed three-dimensional image, compared to a composite image of any plurality of images from among the decolorized image, contour extracted image (edge-enhanced image), decolorized inverted image, and contour inverted image. In other words, an embossed image is defined as a processed image that two-dimensionally simulates appearance of an actual textured surface image to be printed on the thermally expandable sheet.

The three-dimensional image forming controlling process 40 controls the three-dimensional image forming device 300. That is, the three-dimensional image forming controlling process 40 controls the two-dimensional image forming device 320 via the printer driver 83, and also controls the foaming device 310. Here, the three-dimensional image forming controlling process 40 causes the display operation unit 200 to display an image indicating "place the medium on the placement stand of the two-dimensional image forming device 320 with the front surface side of the medium facing upward" and causes an image to be formed (printed) on the medium using the front surface data, and next, causes the display operation unit 200 to display an image indicating "place the medium on the placement stand of the two-dimensional image forming device 320 with the rear surface side of the medium facing upward" and causes an image to be formed on the medium using the rear surface data, and, next, causes the display operation unit 200 to display an image indicating "place the medium on the placement stand of the foaming device 310 with the front surface side of the medium facing upward" and causes the foaming device 310 to heat the medium.

The communication controlling process 50 controls the communication unit 90. Here, the printer driver 83 is used when the communication controlling process 50 controls the two-dimensional image forming device 320.

Figure 2:
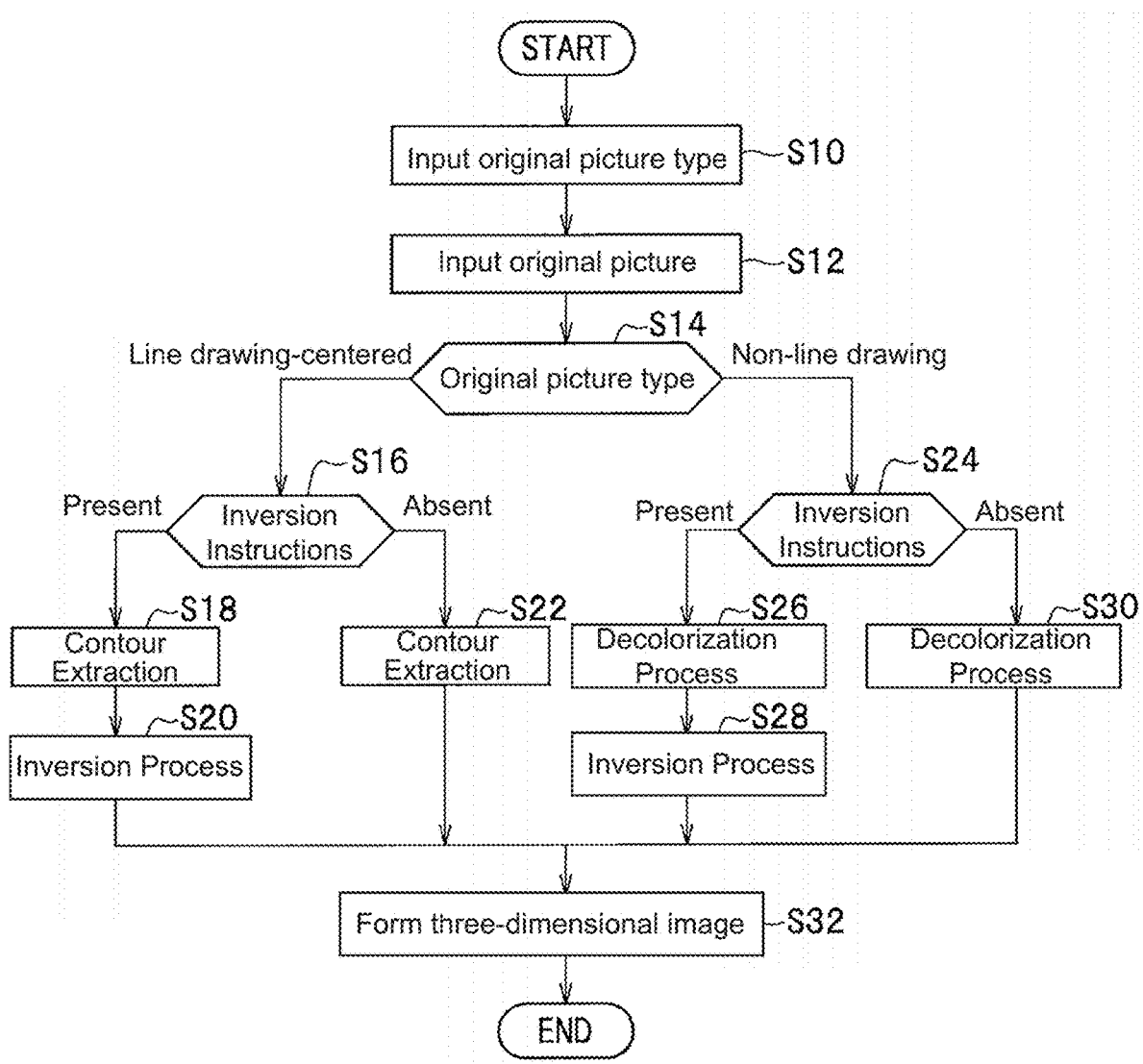
FIG. 2 is a flowchart for when a simple setting is implemented for foaming data on the basis of an original image.

FIG. 2 is a flowchart for when a simple setting is implemented for foaming data on the basis of the original image.

Here, the "simple setting" is a function whereby, when the type of the original picture serving as the original image is selected, it is possible to automatically create foaming data corresponding to that type of original picture.

The display controlling process 30 causes the display operation unit 200 to display a screen (FIG. 3) indicating the type of original picture serving as the original image to be selected and receives selection input selected by the operator (S10), acquires a photograph or the like from a file, captures a photograph or the like from a scanner (not shown) (S12), etc.

Figure 3:
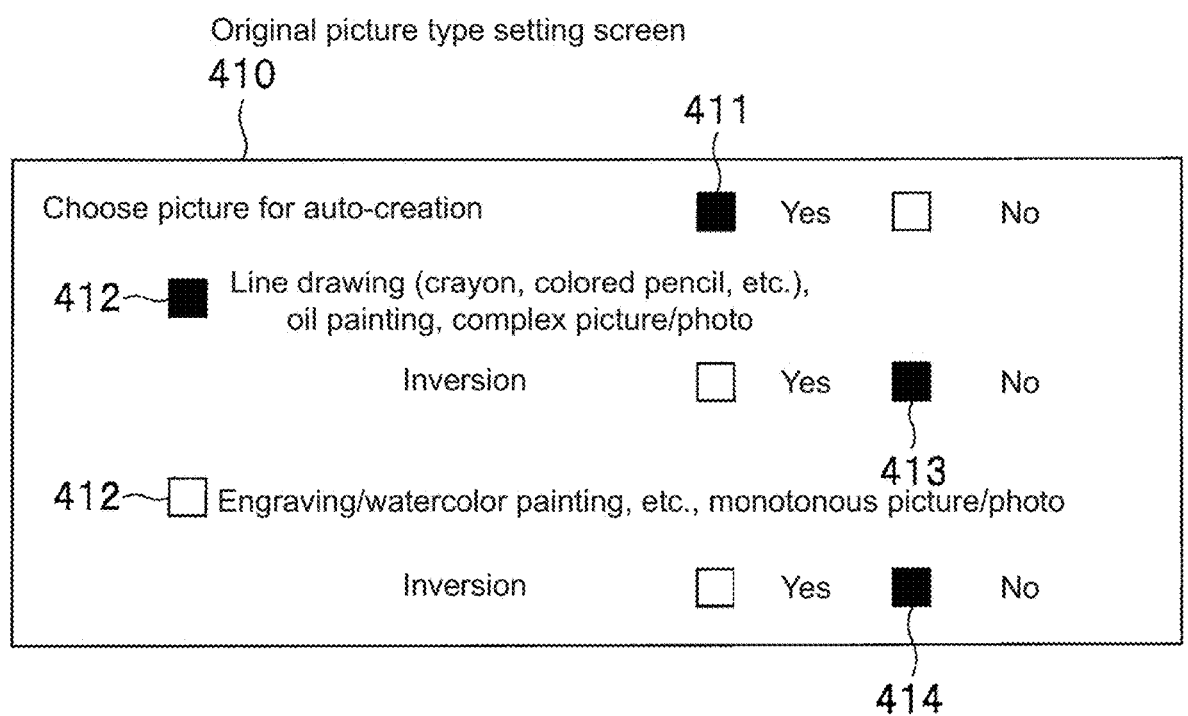
FIG. 3 is a drawing showing an example of a setting screen for when the simple setting is implemented for the foaming data.

FIG. 3 is a drawing showing an example of a setting screen for when the simple setting is chosen for the foaming data.

An original picture type setting screen 410 is provided with: a checkbox 411 that selects whether or not to "select picture and automatically create"; a checkbox 412 that selects whether or not the original picture serving as the original image is a "line drawing" made using a "crayon/color pencil or the like" or an "oil painting or complex picture/photograph," or is a "monotone picture/photograph such as a print/watercolor painting"; and checkboxes 413 and 414 that select whether or not to "invert" those images.

Here, "select picture and automatically create" is set to "yes," "line drawing (crayon/color pencil or the like), oil painting, or complex picture/photograph" is set, and "invert" is set to "no."

Returning to the explanation of the flowchart of FIG. 2, the three-dimensional image forming controlling process 40 (FIG. 1) determines the set state of the checkbox 412 and thereby determines the type of the original picture (S14). In the case where the original picture is mostly a line drawing (line drawing-centered in S14), the three-dimensional image forming controlling process 40 determines the set state of the checkbox 413 and thereby determines whether or not there is a light and shade invert instruction (S16). When there has been an invert instruction (present in S16), the contour extracted image generating process 23 (FIG. 1) extracts contours of the original picture and generates a contour extracted image (S18). After S18, the contour inverted image generating process 24 inverts the light and shade of the contour extracted image and generates a contour inverted image (S20). However, when there has not been an invert instruction according to the determination made in S16 (not present in S16), the contour extracted image generating process 23 (FIG. 1) extracts contours of the original picture and generates a contour extracted image (S22).

Figure 4A:
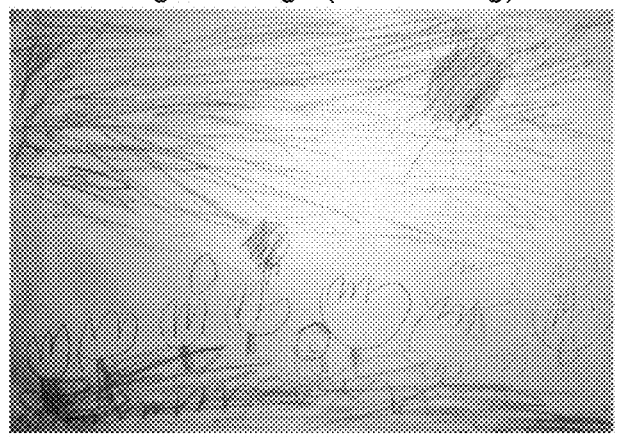
FIG. 4A is a drawing showing an example of an original image of a line drawing.
Figure 4B:
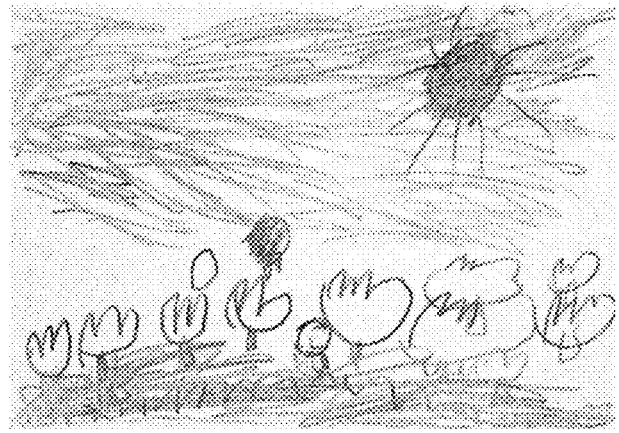
FIG. 4B is a drawing showing an example of a contour extracted image of the line drawing.
Figure 4C:
FIG. 4C is a drawing showing an example of an inverted image obtained by inverting the contour extracted image of the line drawing.

FIG. 4A is a drawing showing an example of an original image of a line drawing, FIG. 4B is a drawing showing an example of a contour extracted image of the line drawing, and FIG. 4C is a drawing showing an example of an inverted image obtained by inverting the contour extracted image of the line drawing.

In these drawings, due to the operator using the checkboxes 412 and 413 (FIG. 3) to set "line drawing (crayon/color pencil or the like), oil painting, or complex picture/photograph" and to set invert to "no," the three-dimensional image forming controlling process 40 (FIG. 1) automatically extracts contours from the input original picture (FIG. 4A) (S22) and generates a contour extracted image (FIG. 4B). It should be noted that when the checkbox 413 (FIG. 3) is used to set "yes," the three-dimensional image forming controlling process 40 automatically inverts the light and shade (S22) and generates a contour inverted image (FIG. 4C). It should be noted that black serves as foaming data for protrusions in the contour extracted image of FIG. 4B, and white serves as foaming data for recesses in the contour inverted image of FIG. 4C.

Returning once again to the flowchart of FIG. 2, when a non-line drawing that is a "monotone picture/photograph such as a print/watercolor painting" has been determined according to the determination made in S14 (non-line drawing in S14), the three-dimensional image forming controlling process 40 three-dimensional image forming controlling process determines the set state of the checkbox 414 and thereby determines whether or not there is a light and shade invert instruction (S24). When there has been an invert instruction (present in S24), the decolorized image generating process 21 (FIG. 1) performs decolorization processing on the original picture and generates a decolorized image (S26). After S26, the decolorized inverted image generating process 22 inverts the light and shade of the decolorized image and generates a decolorized inverted image (S28). However, when there has not been an invert instruction according to the determination made in S24 (absent in S24), the decolorized image generating process 21 decolorizes the original picture and generates a decolorized image (S30).

Figure 5A:
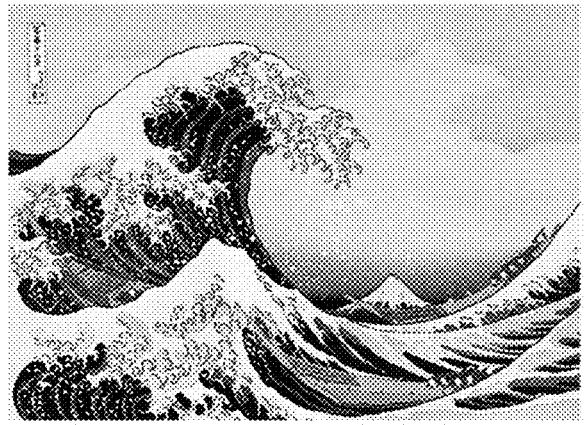
Figure 5B:
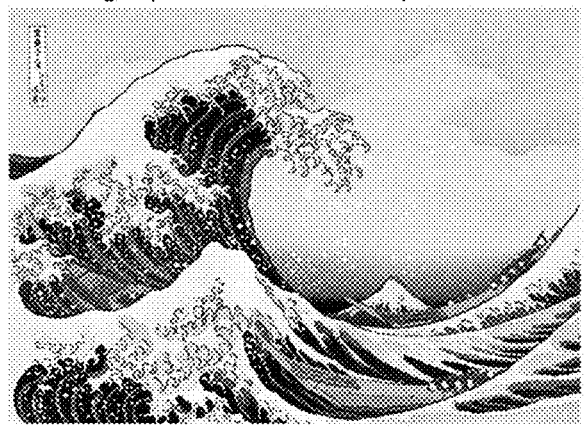
Figure 5C:
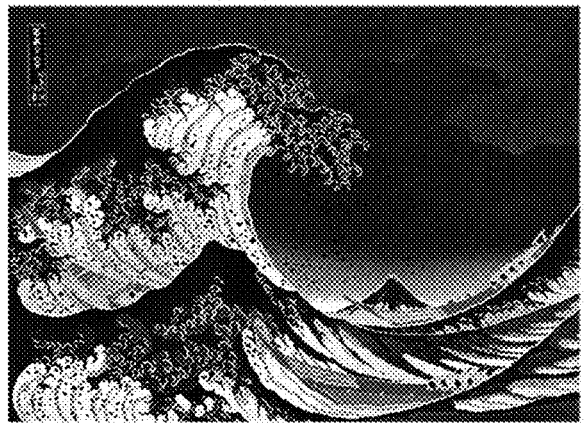

FIG. 5A is a drawing showing an example of an original image of a print or the like, FIG. 5B is a drawing showing an example of a decolorized image of the print or the like, and FIG. 5C is a drawing showing an example of a decolorized inverted image of the print or the like.

In these drawings, due to the operator using the checkbox 412 (FIG. 3) to set "monotone picture/photograph such as a print/watercolor painting," the three-dimensional image forming controlling process 40 automatically decolorizes the input original picture (FIG. 5A) (S30) and generates a decolorized image (FIG. 5B). It should be noted that when the checkbox 414 (FIG. 3) is used to set "yes," the three-dimensional image forming controlling process 40 automatically inverts the light and shade (S28) and generates a decolorized inverted image (FIG. 5C). It should be noted that FIG. 5A shows an example of *The Great Wave off Kanagawa* from the *Thirty-Six Views of Mount Fuji* by Katsushika Hokusai. White serves as foaming data for recesses in the decolorized image of FIG. 5B, and black serves as foaming data for protrusions in the decolorized inverted image of FIG. 5C.

Returning once again to the flowchart of FIG. 2, after S20, S22, S28, and S30, the three-dimensional image forming controlling process 40 causes the three-dimensional image forming device 300 to form a three-dimensional image (S32). That is, the three-dimensional image forming controlling process 40 causes the two-dimensional image forming device 320 to form, on the medium, any image from among the contour inverted image, contour extracted image, decolorized inverted image, and decolorized image, and causes the foaming device 310 to heat the medium on which any of the images has been formed and specific sites of the foaming layer to expand.

Figure 6:
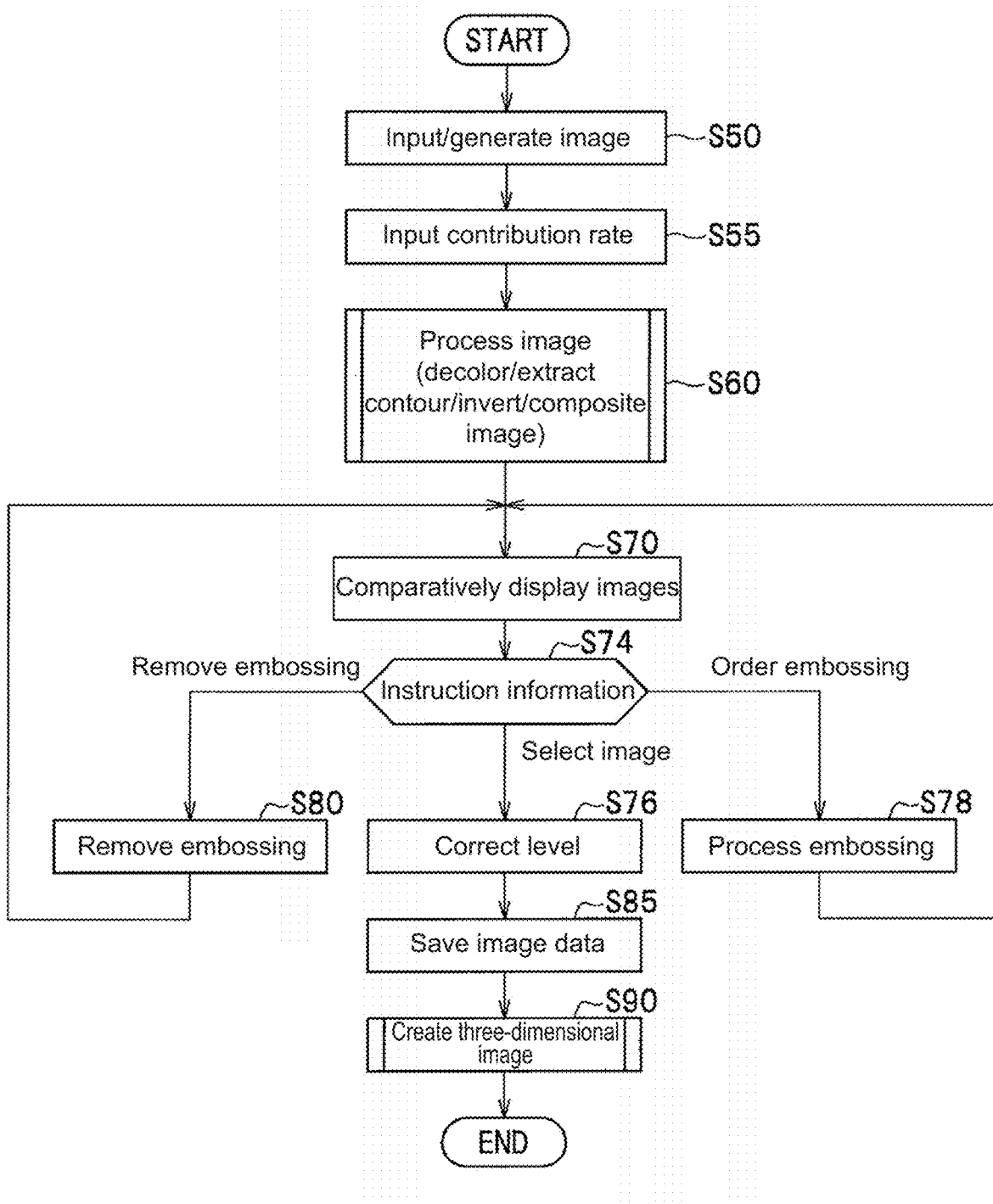
FIG. 6 is a flowchart for when a detailed setting is implemented for the foaming data.

FIG. 6 is a flowchart for when a detailed setting is implemented for the foaming data.

Here, for the detailed setting, image processing content and parameters are set, an operation to confirm a processed image obtained by performing image processing on the original image is repeated, and the image and parameters are fixed.

The controller 10 performs image input/generation (S50). First, the display controlling process 30 causes the display operation unit 200 (FIG. 1) to display a screen (not shown) that prompts image input, and acquires a photograph or the like from a file or captures a photograph or the like from a scanner that is not shown, for example. Next, the display controlling process 30 causes the operator to input a mutual contribution rate for decolorization and contour extraction (S55). That is, the display controlling process 30 causes the display operation unit 200 to display a contribution rate setting screen 420*a* (FIG. 9A), and causes the operator to set a ratio between decolorization and contour extraction. Next, the preview image generating process 20 executes image processing such as decolorization/contour extraction/inversion/image compositing on an input color image (original image) (S60).

Figure 7:
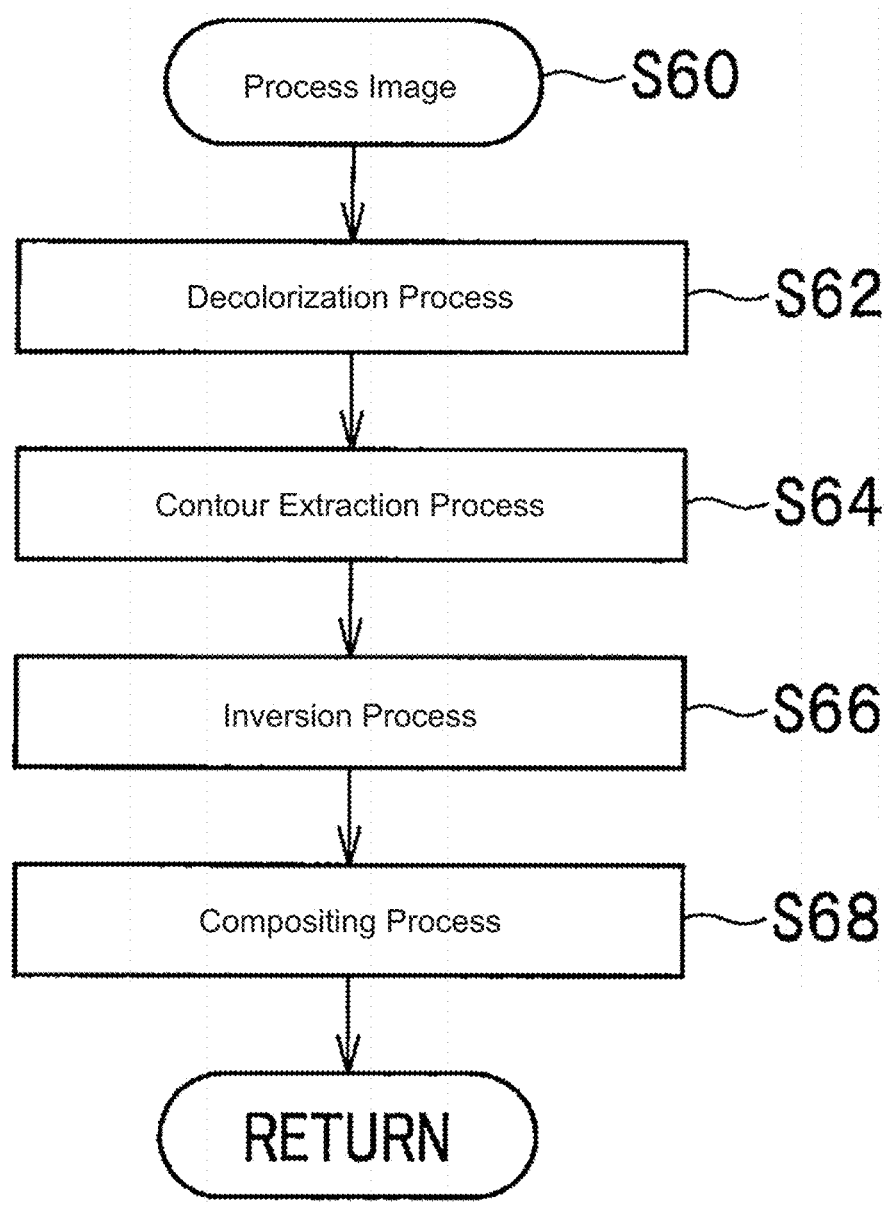
FIG. 7 is a flowchart for image processing.

FIG. 7 is a flowchart for image processing.

First, the decolorized image generating process 21 (FIG. 1) of the preview image generating process 20 performs decolorization processing (S62). That is, the decolorized image generating process 21 extracts the luminance and brightness of the input color image (original image) and generates a decolorized image. Next, the contour extracted image generating process 23 (FIG. 1) performs contour extraction on the input color image (original image) and generates a contour extracted image (S64).

Next, the decolorized inverted image generating process 22 inverts the light and shade of the decolorized image generated in S62 and generates a decolorized inverted image (S66). In addition, the contour inverted image generating process 24 inverts the light and shade of the contour extracted image generated in S64 and generates a contour inverted image (S66). Then, the image compositing process 25 (FIG. 1) composites the decolorized image and the contour extracted image at the contribution rate set in S55 (S68). Furthermore, the image compositing process 25 composites the decolorized image and the contour inverted image, composites the decolorized inverted image and the contour extracted image, and composites the decolorized inverted image and the contour inverted image. Then, processing proceeds to S70 of FIG. 6. It should be noted that the processing of S62 and S64 may be performed in any order.

The display controlling process 30 generates a preview screen 430 (FIG. 9B) and causes the display operation unit 200 to comparatively display the plurality of composite images composited in S68 (S70). That is, the display controlling process 30 causes the comparative display of a non-inverted composite image (the contour extracted image 431, for example) obtained by compositing the decolorized image and the contour extracted image, a first composite image (the contour inverted image 432, for example) obtained by compositing the decolorized image and the contour inverted image, a second composite image 433 obtained by compositing the decolorized inverted image and the contour extracted image, and a third composite image 434 obtained by compositing the decolorized inverted image and the contour inverted image.

At such time, the display controlling process 30, in advance, implements a display indicating "select the optimum image from among the plurality of images." It should be noted that the preview screen 430 is provided with an "execute embossing" button 435 (FIG. 9B) and a "cancel embossing" button 445 (FIG. 13B), and the display device 100 is configured in such a way that a flag changes when these buttons are pressed.

Figures 13A, 13B:
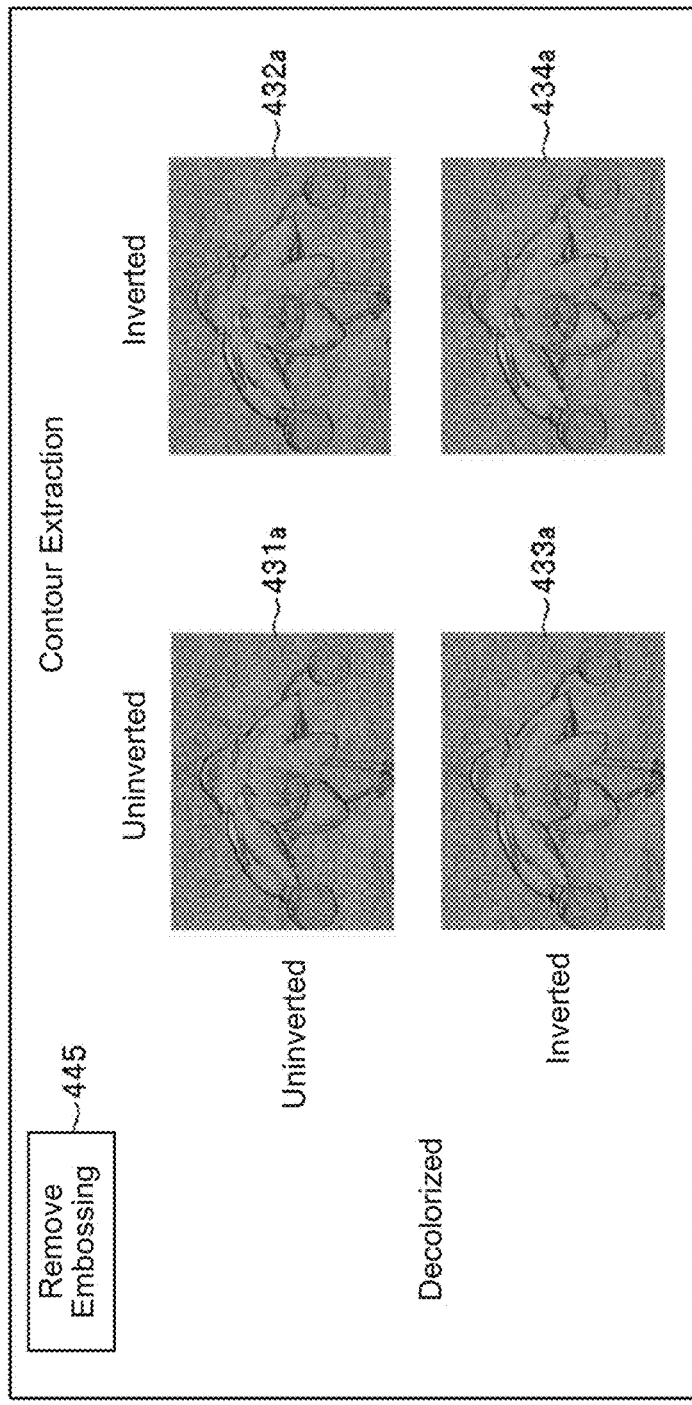
FIGS. 13A and 13B are drawings showing an example of images obtained by performing embossing on comparison images at a contour extraction contribution rate of 100%.

The preview image generating process 20 determines instruction content in the preview screen 430 (S74). That is, the preview image generating process 20 determines the selection of any image from among the non-inverted composite image (the contour extracted image 431, for example), first composite image (the contour inverted image 432, for example), second composite image 433, and third composite image 434, pressing of the "execute embossing" button 435 (FIG. 9B), and pressing of the "cancel embossing" button 445 (FIG. 13B).

Once any one image has been selected from among the non-inverted composite image, first composite image, second composite image, and third composite image (image selection in S74), the preview image generating process 20 performs level correction on the selected image (optimum image) in such a way that excessive foaming does not occur (S76), and saves the level-corrected image data 84 in the nonvolatile storage 80 (FIG. 1) (S85). That is, the preview image generating process 20 ensures that excessive foaming does not occur due to front foaming data and rear foaming data overlapping. Then, the three-dimensional image forming controlling process 40 (FIG. 1) forms a three-dimensional image on the medium (S90). "Excessive foaming" is a state in which the foaming layer (expansion layer) foams too much, causing the foaming portions to collapse.

Figure 8:
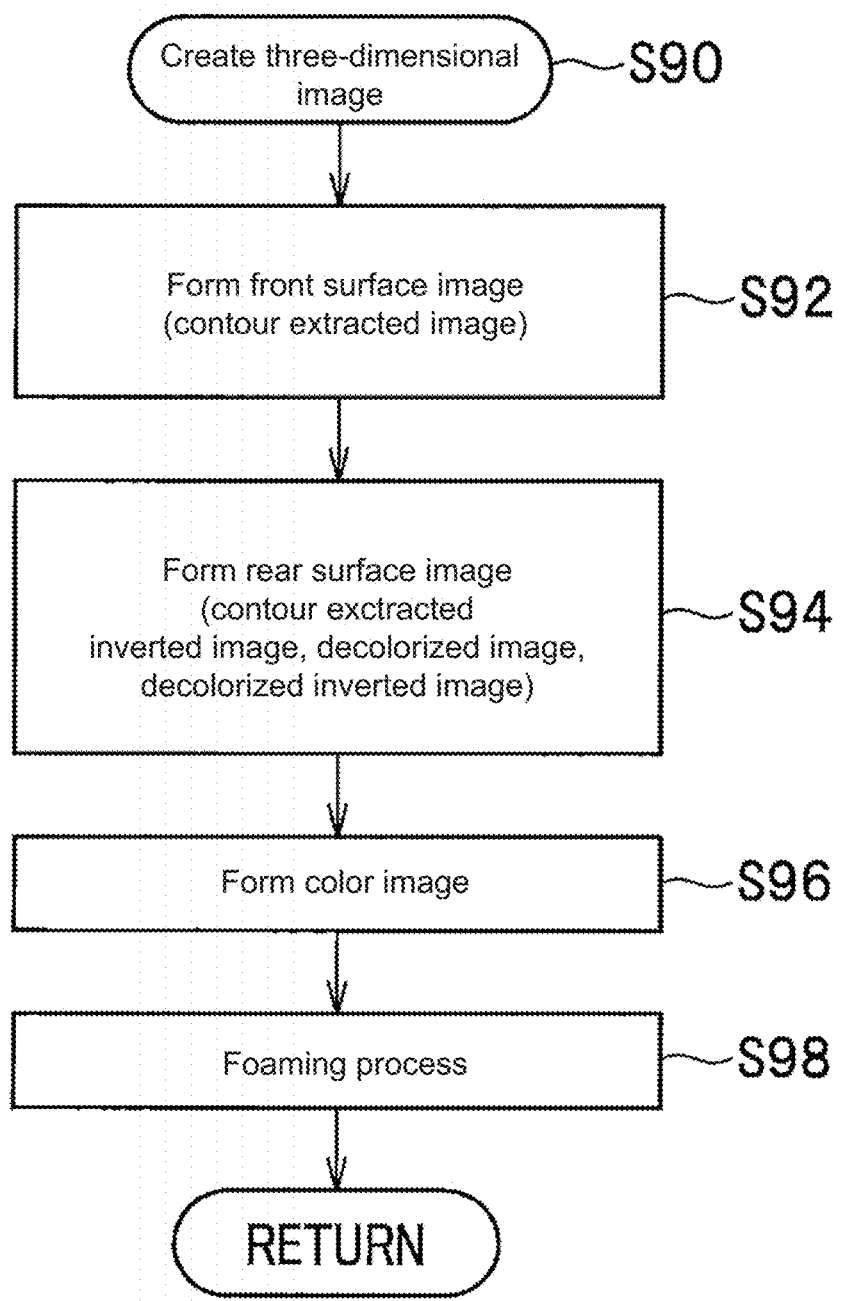
FIG. 8 is a flowchart for three-dimensional image forming.

FIG. 8 is a flowchart for three-dimensional image forming.

The three-dimensional image forming controlling process 40 uses the two-dimensional image forming device 320 to cause a black image to be formed on the front surface of the medium (S92). The contour extracted image, for example, is used for this image. Next, the three-dimensional image forming controlling process 40 uses the two-dimensional image forming device 320 to cause a black image to be formed on the rear surface of the medium (S94). The contour extracted inverted image, decolorized image, or decolorized inverted image, for example, is used for this image. Next, the three-dimensional image forming controlling process 40 uses the two-dimensional image forming device 320 to cause a color image to be formed on the medium (S96). Next, the three-dimensional image forming controlling process 40 uses the foaming device 310 to heat the medium and cause the black image used on the front surface side and the image used on the rear surface side to be foamed (S98), and processing ends.

If an embossing instruction has been determined in the determination made in S74, the embossing process 26 (FIG. 1) executes embossing (S78) and returns to the processing of S70, and the display controlling process 30 causes the display operation unit 200 to comparatively display the plurality of composite images subjected to embossing (S70). Then, the preview image generating process 20 performs level correction on the selected image in such a way that excessive foaming does not occur (S76). At such time, the level-corrected image is an image (contour extracted image, contour extracted inverted image, decolorized image, or decolorized inverted image) from before embossing is performed, not a composite image that has been embossed. Then, the level-corrected image data 84 is saved in the nonvolatile storage 80 (FIG. 1) (S85). Then, the three-dimensional image forming controlling process 40 (FIG. 1) uses the image data 84 to cause a three-dimensional image to be formed on the medium (S90).

If an embossing cancellation has been instructed in the determination made in S74, the embossing process 26 (FIG. 1) cancels embossing (S80) and returns to the processing of S70, and the display controlling process 30 comparatively displays the plurality of composite images subjected to the embossing cancellation (S70). Then, the preview image generating process 20 performs level correction on the optimum image selected by the operator, in such a way that excessive foaming does not occur (S76), and saves the level-corrected image data 84 in the nonvolatile storage 80 (FIG. 1) (S85). Then, the three-dimensional image forming controlling process 40 (FIG. 1) uses the image data 84 to form a three-dimensional image on the medium (S90).

FIGS. 9A and 9B are drawings showing an example of a setting image at a contour extraction contribution rate of 100%, and comparison images. In the contribution rate setting screen 420 (420a) of FIG. 9A, the "no" checkbox for selecting a picture and automatically creating is selected, a slide bar 425 is set to "contour extraction" at the right end, indicating that the contour extraction contribution rate is 100% and the decolorization contribution rate is 0%.

FIG. 9B is the preview screen 430 (430a) and is comparatively displaying four composite images. The top left is a composite image of a decolorized image and a contour extracted image, the top right is a composite image of the decolorized image and a contour inverted image, the bottom left is a composite image of a decolorized inverted image and the contour extracted image, and the bottom right is a composite image of the decolorized inverted image and the contour inverted image. In particular, because the contour extraction contribution rate is 100% and the decolorization contribution rate is 0%, the contour extracted image 431 is displayed in the top left and the contour inverted image 432 is displayed in the top right. Furthermore, the composite image (the second composite image 433) of the decolorized inverted image and the contour extracted image in the bottom left has no contribution from the decolorized inverted image and is the same as the contour extracted image 431, and the composite image (the third composite image 434) of the decolorized inverted image and the contour inverted image in the bottom right has no contribution from the decolorized inverted image and is the same as the contour inverted image 432.

FIGS. 10A and 10B re drawings showing an example of a setting image at a decolorization contribution rate of 100%, and comparison images. FIG. 10A is a contribution rate setting screen 420b, the "no" checkbox for selecting a picture and automatically creating is selected, the slide bar 425 is set to "decolorization" at the left end, indicating that the decolorization contribution rate is 100% and the contour extraction contribution rate is 0%.

In FIG. 10B, the composite image of the decolorized image and the contour extracted image in the top left has no contribution from the contour extracted image and is the decolorized image 436, and a composite image 437 of the decolorized image and the contour inverted image in the top right has no contribution from the contour inverted image and is the same as the decolorized image 436. The composite image of the decolorized inverted image and the contour extracted image in the bottom left has no contribution from the contour extracted image and is the decolorized inverted image 438. A composite image 439 of the decolorized inverted image and the contour inverted image in the bottom right has no contribution from the contour inverted image and is the same as the decolorized inverted image 438.

FIGS. 11A and 11B are drawings showing an example of a setting image when the contour extraction contribution rate is 50% and the decolorization contribution rate is 50%, and comparison images.

FIG. 11A is a contribution rate setting screen 420c, the "no" checkbox for selecting a picture and automatically creating is selected, and the slide bar 425 is set to the midpoint between "decolorization" and "contour extraction."

In FIG. 11B, an image 451 in the top left is a non-inverted composite image obtained by equally compositing the decolorized image 436 (FIG. 10B) and the contour extracted image 431 (FIG. 9B), an image 452 in the top right is a composite image obtained by equally compositing the decolorized image 436 and the contour inverted image 432 (FIG. 9B), an image 453 in the bottom left is a composite image obtained by equally compositing the decolorized inverted image 438 (FIG. 10B) and the contour extracted image 431, and an image 454 in the bottom right is a composite image obtained by equally compositing the decolorized inverted image 438 and the contour inverted image 432.

Figure 12A:
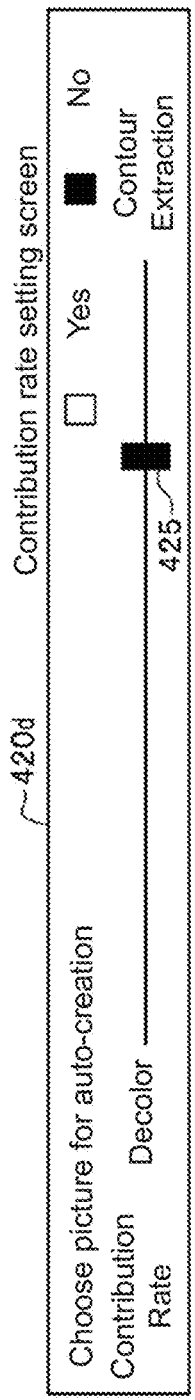
FIGS. 12A and 12B are drawings showing an example of a setting image when the contour extraction contribution rate is 75% and the decolorization contribution rate is 25%, and comparison images.
Figure 12B:
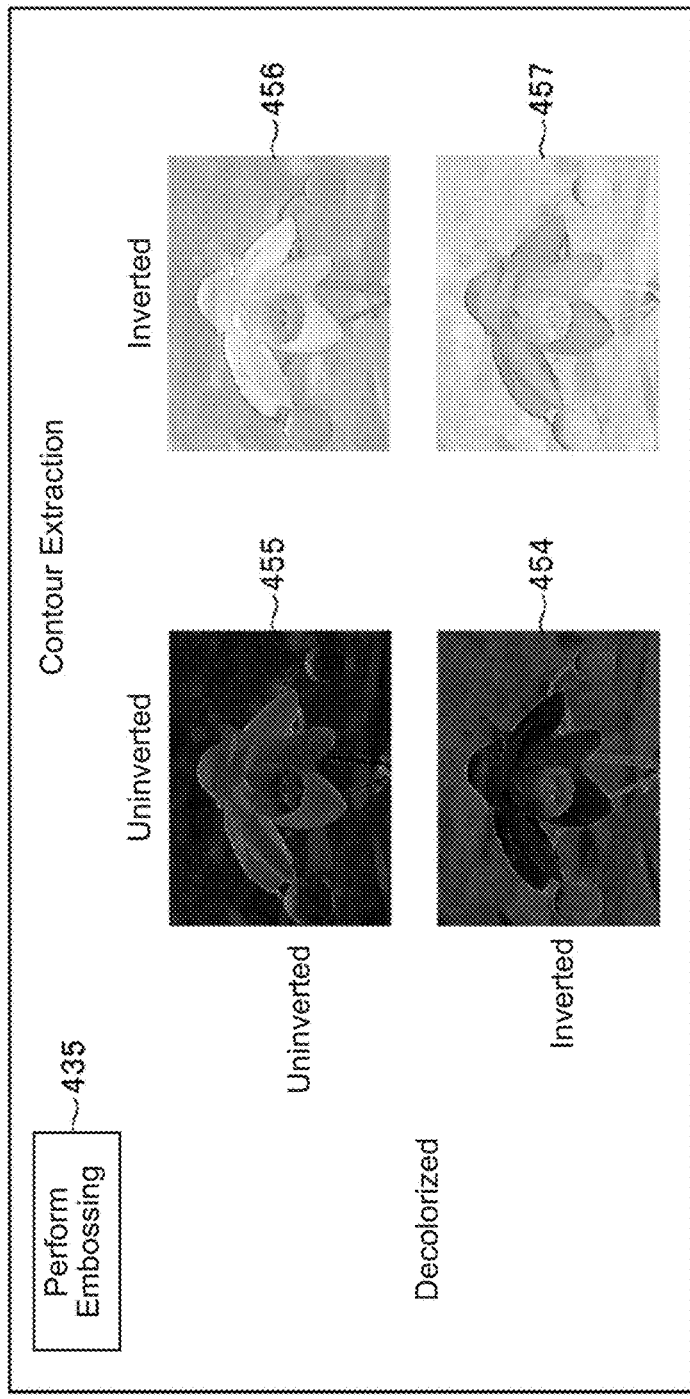

FIGS. 12A and 12B are drawings showing an example of a setting image when the contour extraction contribution rate is 75% and the decolorization contribution rate is 25%, and comparison images.

FIG. 12A is a contribution rate setting screen 420d, the "no" checkbox for selecting a picture and automatically creating is selected, and the slide bar 425 is set to a dividing point that divides between "decolorization" and "contour extraction" at 3:1.

In FIG. 12B, an image 455 in the top left is a composite image obtained by compositing the decolorized image 436 (FIG. 10B) and the contour extracted image 431 (FIG. 9B) at 1:3, an image 456 in the top right is a composite image obtained by compositing the decolorized image 436 and the contour inverted image 432 (FIG. 9B) at 1:3, an image 454 in the bottom left is a composite image obtained by compositing the decolorized inverted image 438 (FIG. 10B) and the contour extracted image 431 at 1:3, and an image 457 in the bottom right is a composite image obtained by compositing the decolorized inverted image 438 and the contour inverted image 432 at 1:3.

FIGS. 13A and 13B are drawings showing an example of images obtained by performing embossing on comparison images at a contour extraction contribution rate of 100%.

FIG. 13A is the same as the contribution rate setting screen 420a of FIG. 9A. An embossing preview screen 440a of FIG. 13B is comparatively displaying four embossed images. An image 431a in the top left is an embossed image of the contour extracted image 431 (FIG. 9B), an image 432a in the top right is an embossed image of the contour inverted image 432 (FIG. 9B), an image 433a in the bottom left is an embossed image of the second composite image 433 (FIG. 9B), and an image 434a in the bottom right is an embossed image of the third composite image 434 (FIG. 9B). Furthermore, the embossing preview screen 440a is provided with the "cancel embossing" button 445, and when pressed, embossing is canceled and the preview screen 430a (FIG. 9B) is once again displayed.

FIGS. 14A and 14B are drawings showing an example of images obtained by performing embossing on comparison images at a decolorization contribution rate of 100%.

FIG. 14A is the same as the contribution rate setting screen 420b of FIG. 10A. Images 436a, 437a, 438a, and 439a of an embossing preview screen 440b of FIG. 14B are embossed images obtained by performing embossing on each image of a preview screen 430b (FIG. 10B).

FIGS. 15A and 15B re drawings showing an example of images obtained by performing embossing on comparison images when the contour extraction contribution rate is 50% and the decolorization contribution rate is 50%.

FIG. 15A is the same as the contribution rate setting screen 420c of FIG. 11A. Images 451a, 452a, 453a, and 454a of an embossing preview screen 440c of FIG. 15B are embossed images obtained by performing embossing on each image of a preview screen 430c (FIG. 11B).

Figure 16A:
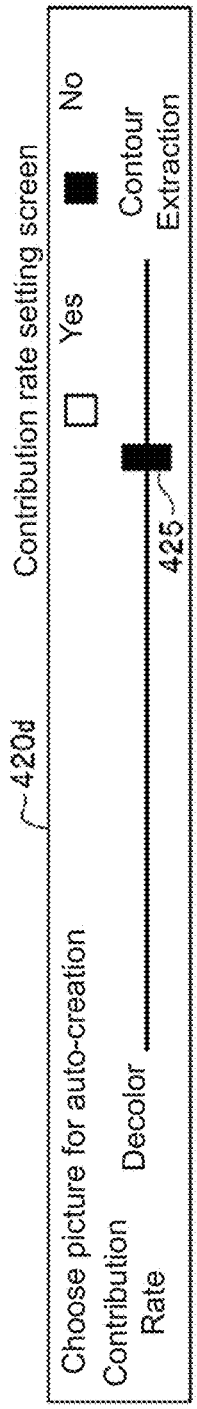
FIGS. 16A and 16B are drawings showing an example of images obtained by performing embossing on comparison images when the contour extraction contribution rate is 75% and the decolorization contribution rate is 25%.
Figure 16B:
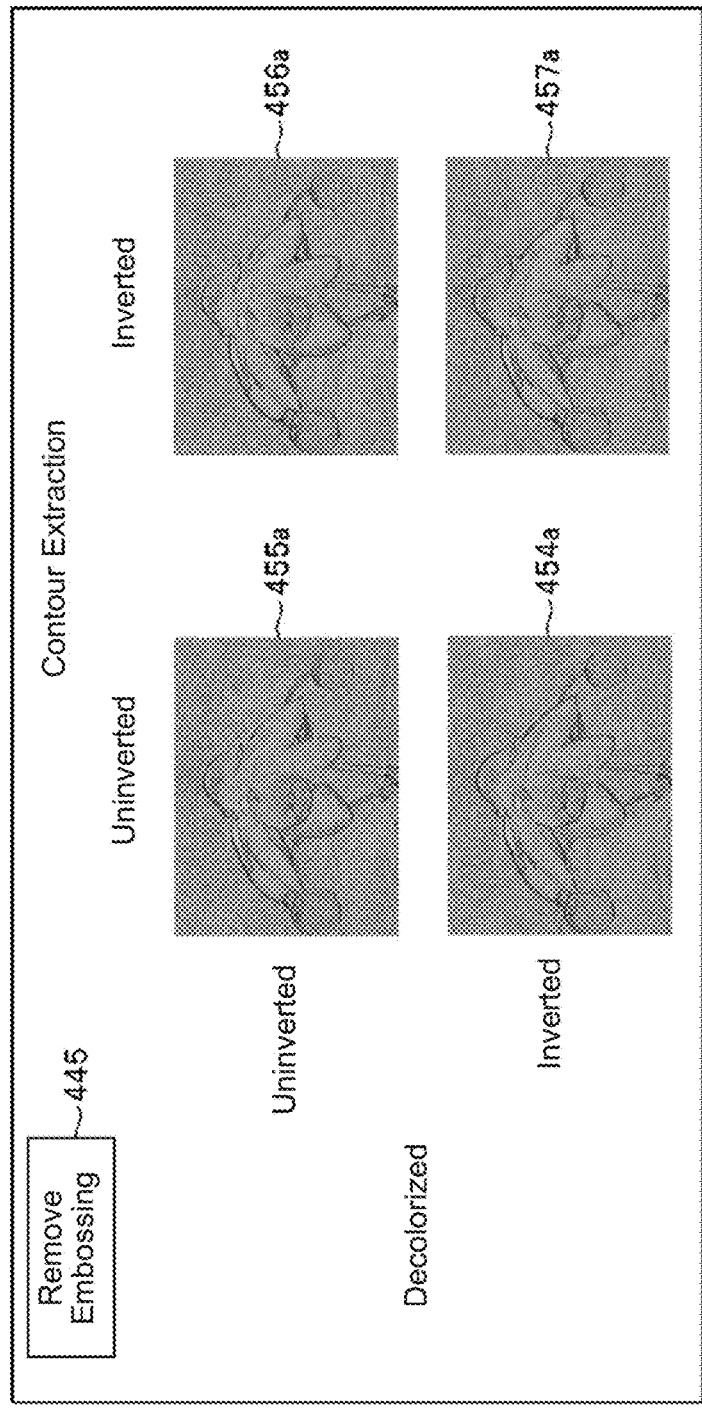

FIGS. 16A and 16B are drawings showing an example of images obtained by performing embossing on comparison images when the contour extraction contribution rate is 75% and the decolorization contribution rate is 25%.

FIG. 16A is the same as the contribution rate setting screen 420d of FIG. 12A. Images 455a, 456a, 457a, and 458a of an embossing preview screen 440d of FIG. 16B are embossed images obtained by performing embossing on each image of a preview screen 430d (FIG. 12B).

As explained above, the display device 100 of the present embodiment is able to cause the display operation unit 200 to display the "yes"/"no" checkbox 411 for automatically creating foaming data and the checkbox 412 for selecting whether or not there is a "line drawing (crayon/color pencil or the like), oil painting, or complex picture/photograph" or a "monotone picture/photograph such as a print/watercolor painting," generate front surface data and rear surface data in accordance with whether there is a line drawing or the like or a print or the like, and cause a three-dimensional image to be formed on the medium placed on the three-dimensional image forming device 300, using the generated front surface data and rear surface data.

Furthermore, the display device 100 of the present embodiment, when foaming data is not to be automatically created, is able to cause the display operation unit 200 to implement a comparative display with the preview screen 430 provided with a composite image (non-inverted composite image) of the decolorized image 436 and the contour extracted image 431, a composite image (first composite image) of the decolorized image 436 and the contour inverted image 432, a composite image (second composite image) of the decolorized inverted image 438 and the contour extracted image 431, and a composite image (third composite image) of the decolorized inverted image 438 and the contour inverted image 432. These comparatively displayed images are pseudo three-dimensional images, and are preview images with which the operator is able to grasp the feel and appearance of a 2.5D three-dimensional image prior to being formed on a medium.

Furthermore, the preview screen 430 is provided with the "execute embossing" button 435, and the display device 100 is able to cause the display operation unit 200 to implement a comparative display with the embossing preview screen 440 that is provided with embossed images of each image. Here, the embossed images of FIGS. 13B to 16B have sufficient quality for grasping the feel and appearance of a formed 2.5D three-dimensional image.

Also, the display device 100 is able to cause the three-dimensional image forming device 300 to form a three-dimensional image of an image selected from among the plurality of composite images and embossed images displayed. At such time, an image for forming a two-dimensional image on the medium is any one of a contour extracted image, contour extracted inverted image, decolorized image, and decolorized inverted image or a combination thereof. Furthermore, it is preferable that the front surface data be a contour extracted inverted image, and it is preferable that the rear surface data be any one of a contour extracted inverted image, decolorized image, and decolorized inverted image or a combination thereof.

Modification Examples

The present invention is not limited to the aforementioned embodiment, and various modifications such as the following are possible.

(1) In the three-dimensional image forming system 1000 of the aforementioned embodiment, in principle, the contour extracted image is used as front foaming data and any one of the contour extracted inverted image, decolorized image, and decolorized inverted image is used as rear foaming data; however, a composite image (non-inverted composite image) obtained by incorporating the decolorized image into the contour extracted image at a set contribution rate can also be used as front foaming data.

(2) In the display device 100 of the aforementioned embodiment, a comparative display is implemented for the four composite images of a non-inverted composite image obtained by compositing the decolorized image 436 and the contour extracted image 431, a first composite image obtained by compositing the decolorized image 436 and the contour inverted image 432, a second composite image obtained by compositing the contour extracted image 431 and the decolorized inverted image 438, and a third composite image obtained by compositing the contour inverted image 432 and the decolorized inverted image 438. The display device 100 may comparatively display any two or three composite images instead of four composite images. At such time, it is preferable that the display device 100 always display the non-inverted composite image obtained by compositing the decolorized image 436 and the contour extracted image 431; however, other composite images (the first composite image, second composite image, and third composite image) may be comparatively displayed instead of displaying this non-inverted composite image.

FIGS. 9A and 9B to 12A and 12B are printing images (images for black printing), and FIGS. 13A and 13B to 16A and 16B are foamed images (images for embossing). The preview image generating process 20 may cause the display operation unit 200 to display both a printing image and a foamed image on a display screen. The preview image generating process 20 may also display the original image (color image) together with a printing image or a foamed image.

The operator can thereby perceive what kind of three-dimensional image can be formed from the original image. Furthermore, the operator can grasp the feel and appearance of the formed three-dimensional image. Furthermore, a flat image can be displayed in a pseudo three-dimensional manner.

In the present embodiment, the contribution rate is adjusted at the stage prior to compositing (contour extraction and decolorization processing); however, the contribution rate may be adjusted after compositing.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A printer for printing a surface-textured image on a thermally expandable sheet, comprising:
    a display unit;
    a user input receiver;
    a processor connected to the display unit and the user input receiver, the processor being configured to:
        receive an original image data of an original image to be printed on the thermally expandable sheet;
        edit the original image data in a plurality of editing manners that are pre-selected or user-selected to generate a plurality of edited image data, the plurality of edited image data corresponding to mutually different textured surface profiles to be created on the thermally expandable sheet;
        cause the display unit to display a plurality of preview images that are generated in accordance with the plurality of edited image data, respectively, at once so as to enable a simultaneous comparison of differences among the plurality of editing manners by a user;
        receive, from the user via the user input receiver, a command to select one of the plurality of edited image data;
    a printing unit that prints a corresponding image on said thermally expandable sheet based on the selected one of the plurality of edited image data; and
    a light radiating unit that radiates light onto said image printed on said thermally expandable sheet so as to cause the thermally expandable sheet to expand due to thermal expansion, thereby creating the surface-textured image on the thermally expandable sheet.

2. The printer according to claim 1, wherein the processor causes the display unit to display the plurality of preview images side-by-side.

3. The printer according to claim 1, wherein one of the plurality of editing manners is to generate an embossed image that is defined as a processed image that two-dimensionally simulates appearance of an actual surface-textured image to be printed on the thermally expandable sheet.

4. The printer according to claim 1, wherein the plurality of editing manners differs from each other in editing methods or editing degree.

5. The printer according to claim 1, wherein the plurality of editing manners includes one or more of the following editing manners:
    generating a decolorized image in which the original image has been converted to grayscale;
    generating a first inverted image in which light and shade of the original image are inverted;
    generating an edge-enhanced image in which edges of the original image are enhanced;
    generating a second inverted image in which light and shade of the edge-enhanced image are inverted; and
    generating one or more composite images, each of the composite images being formed by compositing two or more of said decolorized image, said first inverted image, said edge-enhanced image, and said second inverted image.

6. The printer according to claim 5, wherein the plurality of editing manners generates a plurality of said composite images that are respectively composited with differing composite ratios.

7. The printer according to claim 1,
    wherein the processor is further configured to receive from the user a command to display the original image instead of or in addition to the preview images, and
    wherein the processor causes the display unit to display the original image instead of or in addition to the preview images upon receipt of said command to display the original image.

8. The printer according to claim 7, wherein the processor causes the display unit to display the original image and the preview images.

9. The printer according to claim 1, wherein the processor is further configured to perform level correction on said select one of the plurality of edited image data, and the printing unit prints the corresponding image on said thermally expandable sheet based on the selected one of the plurality of edited image data that has been level-corrected so as to prevent excessive expansion.

10. The printer according to claim 1, wherein the display device is a touch panel integrated display device, wherein the touch panel is said user input receiver.

11. A processor configured to be connected to a printer that prints a surface-textured image on a thermally expandable sheet, the processor being configured to:
    receive an original image data of an original image to be printed on the thermally expandable sheet;
    edit the original image data in a plurality of editing manners that are pre-selected or user-selected to generate a plurality of edited image data, the plurality of edited image data corresponding to mutually different textured surface profiles to be created on the thermally expandable sheet;
    cause a display unit to display a plurality of preview images that are generated in accordance with the plurality of edited image data, respectively, at once so as to enable a simultaneous comparison of differences among the plurality of editing manners by a user;
    receive, from the user, a command to select one of the plurality of edited image data; and
    output to a printing unit a printing data in accordance with selected one of the plurality of edited image data.

12. The processor according to claim 11, wherein the processor causes the display unit to display the plurality of preview images side-by-side.

13. The processor according to claim 11, wherein one of the plurality of editing manners is to generate an embossed image that is defined as a processed image that two-dimensionally simulates appearance of an actual surface-textured image to be printed on the thermally expandable sheet.

14. The processor according to claim 11, wherein the plurality of editing manners differs from each other in editing methods or editing degree.

15. The processor according to claim 11, wherein the plurality of editing manners includes one or more of the following editing manners:
    generating a decolorized image in which the original image has been converted to grayscale;
    generating a first inverted image in which light and shade of the original image are inverted;
    generating an edge-enhanced image in which edges of the original image are enhanced;
    generating a second inverted image in which light and shade of the edge-enhanced image are inverted; and generating one or more composite images, each of the composite images being formed by compositing two or more of said decolorized image, said first inverted image, said edge-enhanced image, and said second inverted image.

16. The processor according to claim 15, wherein the plurality of editing manners generates a plurality of said composite images that are respectively composited with differing composite ratios.

17. The processor according to claim 11,
wherein the processor is further configured to receive from the user a command to display the original image instead of or in addition to the preview images, and
wherein the processor causes the display unit to display the original image instead of or in addition to the preview images upon receipt of said command to display the original image.

18. The processor according to claim 17, wherein the processor causes the display unit to display the original image and the preview images.

19. The processor according to claim 11, wherein the processor is further configured to perform level correction on said select one of the plurality of edited image data, and the printing unit prints the corresponding image on said thermally expandable sheet based on the selected one of the plurality of edited image data that has been level-corrected so as to prevent excessive expansion.

20. A non-transitory storage medium having stored therein instructions executable by a processor that is configured to be connected to a printer that prints a surface-textured image on a thermally expandable sheet, said instructions causing the processor to perform the following:
receive an original image data of an original image to be printed on the thermally expandable sheet;
edit the original image data in a plurality of editing manners that are pre-selected or user-selected to generate a plurality of edited image data, the plurality of edited image data corresponding to mutually different textured surface profiles to be created on the thermally expandable sheet;
cause a display unit to display a plurality of preview images that are generated in accordance with the plurality of edited image data, respectively, at once so as to enable a simultaneous comparison of differences among the plurality of editing manners by a user;
receive, from the user, a command to select one of the plurality of edited image data; and
output to a printing unit a printing data in accordance with selected one of the plurality of edited image data.

* * * * *